United States Patent Office 3,563,798
Patented Feb. 16, 1971

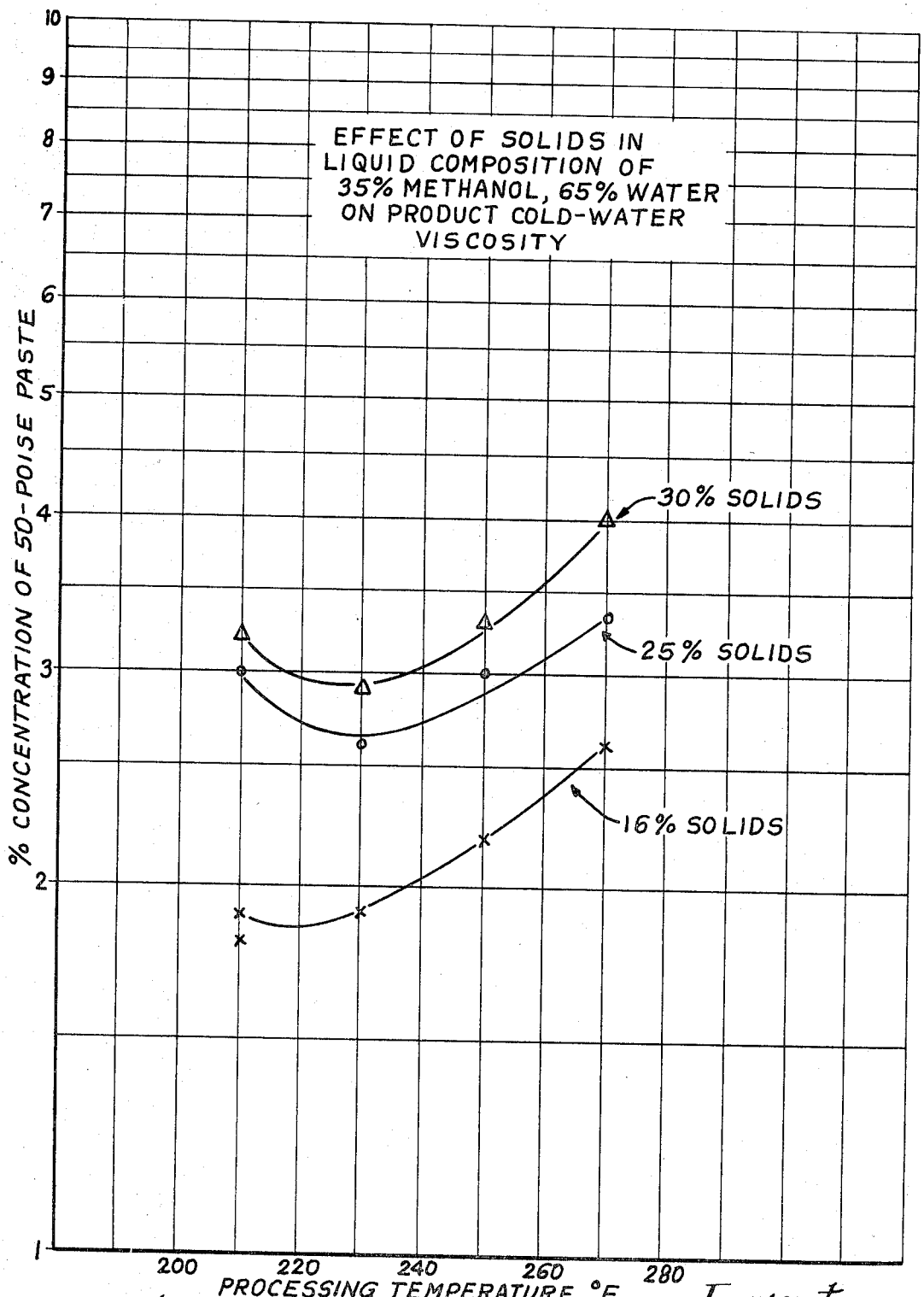

3,563,798
PREGELATINIZED STARCH PRODUCTS AND PROCESS OF MAKING SAME
Felix J. Germino, Palos Park, Francis E. Kite, Riverside, and Edwin H. Christensen, La Grange Park, Ill., assignors to CPC International Inc., New York, N.Y., a corporation of Delaware
Filed Sept. 18, 1967, Ser. No. 668,617
Int. Cl. C13l 1/08
U.S. Cl. 127—32                       26 Claims

ABSTRACT OF THE DISCLOSURE

Cold-water-swelling starches which form aqueous pastes of exceptionally high viscosity are prepared by subjecting, in a confined zone, a slurry of waxy starch, a solvent for starch, and an organic liquid which is miscible with the solvent for starch, to gelatinizing conditions. The treatment conditions and proportions of ingredients are so selected to cause from 0% to about 75% of the waxy starch granules to become fragmented, and the non-fragmented granules to be non-birefringent. After treatment the slurry is combined with additional organic liquid, and the processed starch is then recovered.

---

Figure 1:
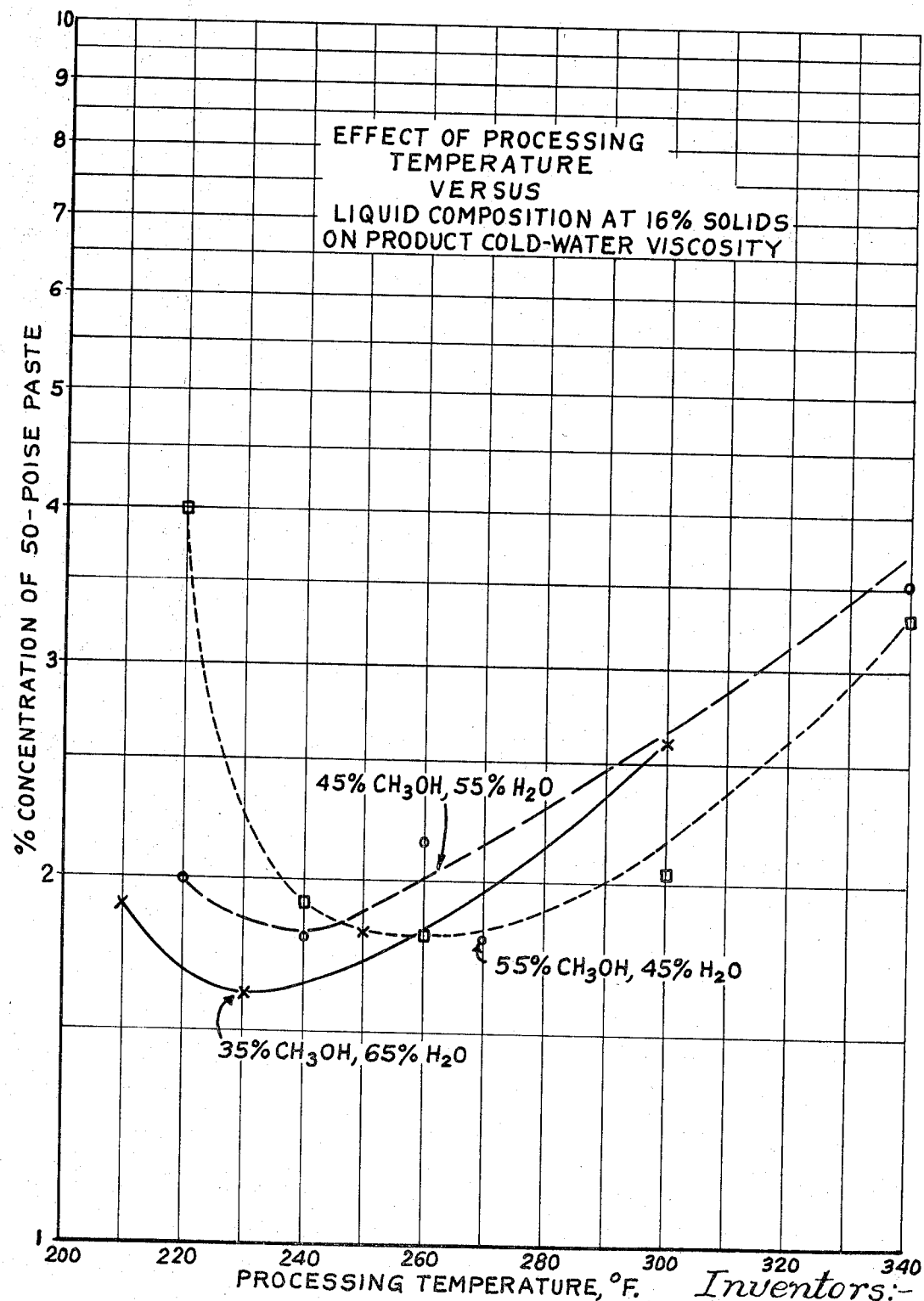

This invention relates to a process for treating waxy starches in order to produce cold-water-swelling starches having remarkable and unexpected viscosity characteristics.

So called "cold-water-swelling" starches (also known as "pregelatinized starches" and "cold-water-dispersible" starches) have been known for some time. They are usually prepared by roll- or spray-drying an aqueous slurry of ungelatinized starch. When added to cold water these starches disperse to form pastes. Dispersion is generally slow, and lump formation is a customary problem during paste formation. Pastes formed from the conventional pregelatinized starches are considerably lower in viscosity than pastes prepared by gelatinizing an aqueous slurry, of like solids concentration, of the parent starch (i.e., the starch from which the pregelatinized starch was derived). Furthermore, pastes prepared from the pregelatinized starches decrease in viscosity when subjected to shear.

Recently a new process for the preparation of cold-water-swelling starch was developed, which produces starches having properties superior to those made by the prior art processes. This process involves slurrying ungelatinized starch in a liquid vehicle comprising a solvent for starch and a non-solvent for starch which is miscible with the solvent for starch, and then subjecting the slurry to gelatinizing conditions. The starches so treated are characterized by having intact, swollen granules, showing from about 40% to 100% (depending upon the specific conditions employed) loss of birefringence. The products hydrate rapidly in cold water to form smooth, viscous pastes. Unlike prior art products, these pastes increase, rather than decrease, in viscosity when subjected to shear. The pastes are less viscous than pastes prepared by gelatinizing the parent starch, but the viscosity decrease is much smaller than that encountered with the conventional pregelatinized (e.g. roll- or spray-dried) starches. This might be explained by the fact that the granules of the conventional pregelatinized starches are all or substantially all fragmented, while those of the new products are all or substantially all intact. Another possible explanation could be that substantial retrogradation takes place during preparation of conventional pregelatinized starches, while little or no retrogradation takes place during the recently developed process. The recently developed process is particularly suitable for treating amylose-containing starches and highly cross-linked waxy starches, but problems have been encountered when attempting to apply it to underivatized or slightly cross-linked waxy starches.

While attempting to formulate specific conditions whereby the aforementioned process could be successfully applied to the waxy starches, we made the surprising discovery that, by treating waxy starches under certain specified conditions, we could produce starch products which would rapidly disperse in cold water to form smooth pastes, which pastes were nearly as viscous and in some cases more viscous, than pastes prepared by gelatinizing a like concentration of the parent starch. To the best of our knowledge, this phenomenon is unique in the art of pregelatinized starches.

The products of the present invention are different in structure and in properties from non-waxy starches treated by the aforementioned recently developed process. The starches of the invention are characterized by from at least about 25%, up to about 100%, intact granules, which intact granules exhibit complete (i.e. 100%) loss of birefringence. In many respects the behavior of the products of the invention is remarkably similar to that of the costly natural gums, such as guar, galactomannan, carrageenin, and the synthetic gums such as carboxymethyl cellulose. Like most of the natural and synthetic gums maximum paste viscosity is achieved if the starch is dispersed in water at a temperature of about 25° C., lower viscosities resulting as the dispersion temperature increases. Paste viscosity also varies with concentration, pH and shear in much the same manner as that of the gums. Also, like many of the natural and synthetic gums, the starch pastes exhibit excellent thermal stability, freeze-thaw stability, and storage stability, which properties make them excellent thickening agents for use in prepared food products. Because of their similarity in properties and behavior to the natural and synthetic gums, coupled with the fact that they are compatible with gums, they are eminently suitable as complete or partial replacements for the more costly gums as thickening and/or suspending agent in foodstuffs or the like.

It is an object of the present invention to prepare cold-water-swelling starch products, from waxy starches, which hydrate rapidly in cold or hot water to form smooth pastes of exceptionally high viscosity.

Another object of the invention is to prepare cold-water-swelling waxy starches which will form pastes in cold water having viscosities nearly as high or higher than that of pastes prepared from the untreated waxy starches from which the cold-water-swelling starches were derived.

It is a further object to prepare starch products which hydrate rapidly in cold water to form smooth, viscous, bland-tasting pastes having exceptionally good thermal stability, freeze-thaw stability and storage stability.

Another object of the present invention is to prepare starch products having properties similar to those of the natural and synthetic gums.

An additional object is to prepare starch products which can be used in the preparation of many food products, as inexpensive replacements for natural and/or synthetic gums.

A more specific object is to treat waxy starches in such a way as to obtain starch products having from at least 25% up to about 100% intact granules, the intact granules of which are further characterized by complete loss of birefringence when viewed under a polarizing microscope.

Other objects and advantages will appear from a reading of the specification and claims.

Figure 2:
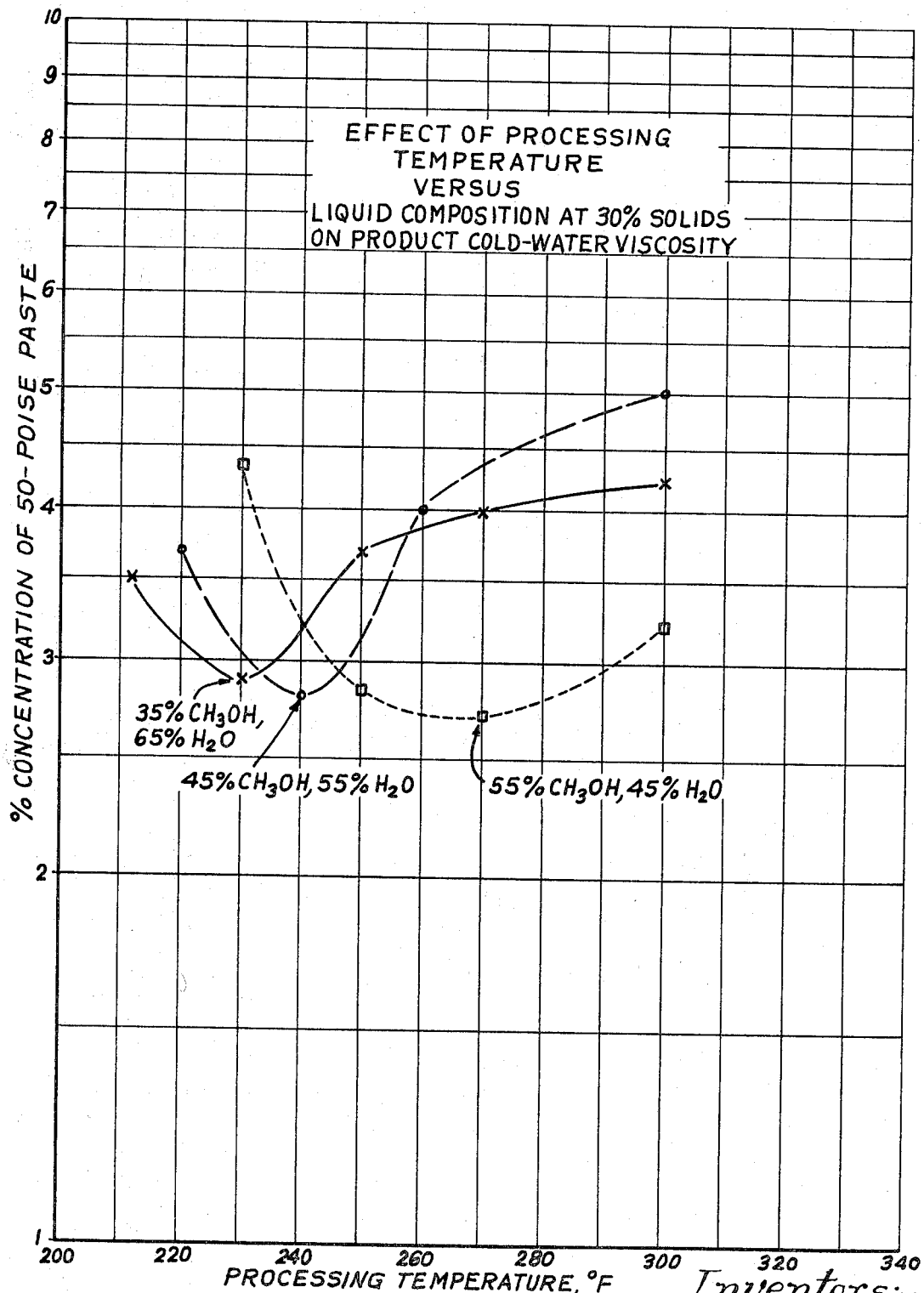

In the drawings:

FIG. 1 is a graphical presentation of data in the form of three curves that describe the cold water viscosities of products obtained by processing cross-bonded waxy starch in accordance with one preferred embodiment of the invention, in liquid vehicles of methanol and water, in different proportions, but at 16% solids in each case, and at different processing temperatures;

FIG. 2 is a similar graphical presentation, but with the starch slurries at 30% solids in each case, and FIG. 3 is another graphical presentation of data in the form of three curves that describe the cold water viscosities of products obtained by processing cross-bonded waxy starch in liquid vehicles of the constant composition of 35% methanol and 65% water, at solids contents of 16%, 25%, and 30% respectively, and at different processing temperatures.

Briefly, the process of the invention is as follows. A waxy starch, in granular, non-gelatinized form, is slurried with a liquid component which comprises (1) a solvent for starch and (2) an organic liquid which is itself not a solvent for starch and which is miscible with the solvent for starch. The relative proportions of the ingredients in the slurry are critical, as will be explained fully hereinafter.

The slurry is placed in a suitable vessel and subjected to gelatinizing conditions for a time sufficient to result in the desired product. Immediately following the treatment it is essential that an additional quantity of the organic liquid, in an amount at least equal, by weight, to the weight of the total slurry, be combined with the slurry, preferably with agitation. The greater the amount of starch solids present in the slurry, the more vigorous agitation that is required.

We shall now define the terms employed in the foregoing description, and shall also explain fully and precisely the conditions of the process.

By the term "waxy starch" is meant amylopectin and those naturally occurring starches which consist exclusively or primarily of amylopectin such as waxy maize, waxy sorghum (also known as waxy milo or white milo), waxy rice, etc. The term is also meant to include the waxy starches which have been slightly cross-linked, i.e. cross-linked to a Scott viscosity as is, i.e. at a pH of about 6.0, of a concentration of 8 grams or less, 40 to 80 seconds for 100 ml. of delivered paste. Preferably, they are cross-linked to a Scott viscosity of 6 grams concentration or less, 40–80 seconds. These waxy starches can be in either unmodified form (i.e. thick-boiling) or modified, as by acid or oxidizing agents, to render them thin-boiling, or otherwise modified. They can also be chemically derivatized, provided such derivatization does not cause excessive cross-linking of the molecules.

It is interesting to note that the slightly cross-linked waxy starches, when treated in accordance with the process of the invention, form products which reconstitute in cold water to form pastes of exceptionally high viscosity, generally higher in viscosity than pastes formed by gelatinizing a like quantity of the untreated starch.

By the term "non-gelatinized" (or "ungelatinized") is meant that the granules of the starch are completely intact and exhibit substantially 100% birefringence, i.e. substantially all of the granules show the characteristic maltese crosses when viewed under a polarizing microscope.

By the term "solvent for starch" is meant any liquid in which starch will solvate, or gelatinize. Water is, of course, by far the most economical and commonly used starch solvent or gelatinizing agent, and is therefore preferred in our process. Other starch solvents, e.g. dimethyl sulfoxide, 2 amino ethanol, N-methyl pyrrolidone, can also be used however. In the following discussion, we shall refer to the solvent for starch component of the liquid portion of the slurry as the "solvent."

The second component of the liquid portion of the slurry, which we shall refer to as the "organic liquid," can be any organic liquid which is miscible with the solvent for starch and which is not itself a solvent for starch. If the starch is to be used as an ingredient in food, then obviously substantially all of the organic liquid must be removed from the starch after treatment; for this reason it is desirable to use a liquid which is not excessively retained within the starch granules. It is also desirable, for economic reasons, to select a liquid which can be readily recovered from the solvent for reuse. Lower alcohols (e.g. methanol, ethanol, isopropanol, tertiary butanol), ketones (e.g. acetone, methyl ethyl ketone), dioxane, etc. are particularly suitable in the practice of the invention.

By the term "gelatinizing conditions" is meant the type of conditions which would be necessary to gelatinize the starch in the particular solvent being used. When using the preferred solvent, i.e. water, heat is of course necessary.

We shall now explain fully the process conditions using water as the solvent. The permissible temperature range is from about 200° F. to about 300° F. The liquid portion of the slurry must contain from about 40% to about 65% water and from about 60% to about 35% organic liquid (percentages by weight based on the weight of the total liquid phase); the preferred conditions are from about 35% to about 65% water; the remainder being organic liquid. The maximum amount of starch which can be present in the slurry is about 40%, by weight based on the weight of the total slurry. Preferably, not more than about 30% solids should be present in the slurry, as the process is easier to control when a slurry of 30% solids or less is used. Furthermore, if the process is to be operated in a continuous manner, a slurry containing much more than 30% solids could not be employed because it could not readily be pumped. There is no critical lower limit to the amount of starch present in the slurry, but less than about 10% is uneconomical.

There is an interrelationship among the following variables: (1) relative proportions of solvent and organic liquid in the liquid phase of the slurry; (2) relative proportions of the solid phase (starch) and the liquid phase of the slurry; (3) temperature of treatment. This interrelationship will readily be seen from the data set forth in the examples and from the drawings. The drawings clearly illustrate the fact that starches treated in accordance with the invention reach, as the processing conditions are varied within the specified limits, peak viscosities. The data presented in the specification will enable one skilled in the art readily to select the optimum processing conditions for any desired system.

Time of treatment is also an important factor and to a certain extent is also interdependent with the three aforementioned variables. The time of treatment should not exceed about 60 minutes, and is preferably not more than about 15 minutes. Usually, about 2½ to 3 minutes is adequate to produce the desired product, but additional holding time up to 60 minutes (but preferably not greater than 15 minutes) can be tolerated without damaging the starch. At lower solids levels the reaction takes place extremely rapidly; for example, at 16% solids and 210° F. (35% organic liquid/65% solvent) excellent products can be produced in as short a time as 0.9 minute. More time is required for systems containing higher solids; for example, at 25% solids and a temperature of 230° F. at least 1.5 minutes is required to produce a satisfactory product.

The treatment should take place in a confined zone, in order to permit precise temperature control and also to insure the liquid components of the slurry remaining in the liquid state during the treatment. The process can be performed in any type of closed vessel, such as an autoclave, or a continuous heat exchanger such as a Votator or tubular reactor. The only requirements with respect to equipment used for the process are that it provide a closed system, be equipped with heating means, and permit precise temperature control.

After the heat treatment has been completed, it is important that an additional quantity of fresh organic liquid be combined with the slurry. Furthermore, it is important that this quantity of additional organic liquid be at least equal, by weight, to the weight of the total slurry. If the slurry is not so diluted with an equal quantity of organic liquid, excessive agglomeration of the starch takes place, resulting in an unworkable "rubbery" mass. It is also highly desirable to agitate the slurry during this dilution step in order to obtain adequate dispersion, particularly when a high-solids slurry is employed.

After the dilution step the starch is separated from the liquid portion of the slurry, as by filtration or centrifugation, washed with organic liquid if desired, and dried. Furthermore, the slurry can be milled, after the dilution step, if desired, to reduce any excessive agglomeration. The water content of the starch is reduced to 6% or less, (and preferably 4% or less) by washing with organic liquid prior to drying.

The reduction of water content of the starch to 6% (preferably 4%) is necessary to allow further drying without loss or lessening of final product viscosity when reconstituted in cold water. The recovered dry starch will rapidly disperse in cold water to form a smooth, exceptionally viscous paste.

Starch treated in accordance with the invention retains a relatively large amount of the organic liquid. This retained liquid does not affect the properties of the treated starch, and it need not be removed if the starch is to be used in non-food applications, e.g. as an adhesive or the like. If, on the other hand, an edible starch is desired, substantially all of this retained organic liquid must be removed. Any suitable method can be employed for this removal, and we shall set forth one such method which we find to be particularly rapid, effective, and economical.

After separating the starch solids from the liquid portion of the slurry, the water content of the wet filter cake or centrifuge cake is first reduced to about 6% to 4% by weight, based on the weight of the starch, by washing with organic liquid. The water content is then further reduced to about 1.5% or less by drying; we have found that a fluid bed dryer is particularly suitable for this drying step. The retained organic liquid is then removed from the starch by intimately contacting the starch with live steam, while maintaining the temperature of the starch above that at which the steam will condense. It is important that the water content of the starch be not above about 1.5% when the starch is contacted with the steam to prevent or minimize loss or lessening of final product viscosity and to facilitate removal of the organic liquid. A fluid bed apparatus is particularly suitable for this steam treatment, as it permits thorough and intimate contact between the starch and the steam.

The following examples will illustrate the practice of the invention. They are presented for illustrative purposes only, and are not intended to limit the scope of the invention in any way. In the examples all parts and percentages are by weight, unless stated otherwise.

EXAMPLE I

A series of runs was made, using a slightly cross-linked white milo starch phosphate, and water and methanol as the solvent and organic liquid, respectively.

The starch had been cross-linked to a Scott viscosity of 4 grams/47 seconds, 100 ml. delivered paste. When an aqueous slurry of the cross-linked starch of a concentration of about 3.3% was gelatinized a paste of 50 poise viscosity, as measured on a model RVT Brookfield Viscometer resulted. The slurries were treated in a Votator. The treated slurries were discharged from the Votator directly into a tank containing methanol in an amount which resulted in a dilution of 1.5 parts methanol per part of slurry. The slurry was agitated during the dilution step. The treated starches were then recovered from the slurries, washed with additional methanol, and dried. In all cases the starches rapidly dispersed in cold (i.e. about 25° C.) water to form smooth viscous pastes. Viscosities were determined, and reported as the percent starch concentration required to produce a 50 poise aqueous paste when measured by a model RVT Brookfield viscometer.

Tables I, II, and III give the various processing conditions and the results in terms of viscosities. The interrelationships of proportions of ingredients in the slurry, processing temperature, and holding time can readily be seen from these tables. FIGS. I, II, and III graphically illustrate these interrelationships, and both the figures and the tables clearly show the fact that starches treated in accordance with the invention reach peak viscosities as the processing conditions are varied within the defined limits.

FIGS. I and II show the effect, upon product viscosity, of processing temperature versus liquid portion composition at constant solids contents (16% and 30% solids, respectively). FIG. III shows the effect of solids content versus processing temperature at constant liquid portion composition (35% methanol, 65% water).

A number of the reconstituted pastes of the treated starches were examined under a polarizing microscope in an attempt to correlate granular structure with the viscosity peaks. It is of course difficult to make precise visual determinations of granular structure, but it appeared that the viscosities began to show a decided "upswing" at the point at which the granules were substantially completely intact and has lost all birefringence, that this upswing continued as granule fragmentation occurred and reached a peak at about 50% granule fragmentation. As more granule fragmentation occurs the viscosity decreases, but does not decrease to substantially less than that of the parent (i.e. untreated) starch until more than about 75% granule fragmentation has taken place.

TABLE I.—EFFECT OF PROCESSING TEMPERATURE ON PRODUCT COLD-WATER VISCOSITY AT VARIOUS SOLIDS LEVELS AND LIQUID COMPOSITIONS

| Sample No.: | Liquid composition, percent $CH_3OH$ in water | Solids level, percent starch | Processing temp., °F. | Product viscosity, percent concentration of 50-poise paste |
| --- | --- | --- | --- | --- |
| 1 | 35 | 16 | 205 | 1.9 |
| 2 | 35 | 16 | 230 | 1.6 |
| 3 | 35 | 16 | 250 | 1.9 |
| 4 | 35 | 16 | 300 | 2.6 |
| 5 | 35 | 16 | 340 | 3.0 |
| 6 | 45 | 16 | 210 | 2.0 |
| 7 | 45 | 16 | 240 | 1.8 |
| 8 | 45 | 16 | 260 | 2.2 |
| 9 | 45 | 16 | 340 | 3.5 |
| 10 | 55 | 16 | 220 | 4.0 |
| 11 | 55 | 16 | 240 | 1.9 |
| 12 | 55 | 16 | 260 | 1.8 |
| 13 | 55 | 16 | 300 | 2.0 |
| 14 | 55 | 16 | 340 | 3.2 |
| 15 | 35 | 30 | 212 | 3.5 |
| 16 | 35 | 30 | 230 | 2.9 |
| 17 | 35 | 30 | 250 | 3.7 |
| 18 | 35 | 30 | 270 | 4.0 |
| 19 | 35 | 30 | 300 | 4.0 |
| 20 | 45 | 30 | 220 | 3.7 |
| 21 | 45 | 30 | 240 | 2.8 |
| 22 | 45 | 30 | 260 | 4.0 |
| 23 | 45 | 30 | 300 | 5.0 |
| 24 | 55 | 30 | 230 | 4.0 |
| 25 | 55 | 30 | 250 | 2.8 |
| 26 | 55 | 30 | 270 | 2.7 |
| 27 | 55 | 30 | 300 | 3.2 |

TABLE II.—EFFECT OF STARCH CONCENTRATION IN 35% METHANOL, 65% WATER ON PRODUCT COLD-WATER VISCOSITY

| Sample No.: | Percent solids | Processing temp., °F. | Product viscosity, percent concentration of 50-poise paste |
|---|---|---|---|
| 28 | 16 | 210 | 1.9 |
| 29 | 16 | 230 | 1.9 |
| 30 | 16 | 250 | 2.2 |
| 31 | 16 | 270 | 2.6 |
| 32 | 25 | 210 | 3.0 |
| 33 | 25 | 230 | 2.6 |
| 34 | 25 | 250 | 3.0 |
| 35 | 25 | 270 | 4.0 |
| 36 | 30 | 210 | 3.2 |
| 37 | 30 | 230 | 2.9 |
| 38 | 30 | 250 | 3.3 |
| 39 | 30 | 270 | 4.0 |

TABLE III.—EFFECT OF HOLD TIME ON PRODUCT COLD WATER VISCOSITY
[All runs made in 35% methanol, 65% water]

| | Solids level percent starch | Processing temp., °F. | Product viscosity as percent concentration of 50-poise paste at indicated hold time, min.[a] | | |
|---|---|---|---|---|---|
| | | | 2.5 | 1.5 | 0.9–1.0 |
| Sample No.: | | | | | |
| 40 | 16 | 210 | 1.8 | 1.8 | 1.9 |
| 41 | 16 | 230 | 2.2 | 1.9 | 2.8 |
| 42 | 25 | 230 | 2.6 | 2.6 | 3.4 |
| 43 | 25 | 250 | 2.5 | 3.0 | 3.6 |
| 44 | 35 | 230 | 2.9 | 2.9 | 3.5 |

[a] 2.5 min.: pump setting 4; 1.5 min.: pump setting 6; 0.9–1.0 min. pump setting 10.

EXAMPLE II

This example illustrates the process of the invention as applied to various waxy starches. Example I was repeated with the following starches: native (i.e. non-cross-linked unmodified and underivatized) white milo; native waxy maize; a waxy maize starch acetate cross-linked to a Scott viscosity of 5 gm./60 sec., 100 ml. delivered paste; a white milo starch sulfate cross-linked to a Scott viscosity of 3 gm./50 sec., 100 ml. delivered paste; a waxy maize starch sulfate cross-linked to a Scott viscosity of 4 gm./55 sec., 100 ml. delivered paste; a waxy maize starch phosphate cross-linked to a Scott viscosity of 4 gm./60 sec., 100 ml. delivered paste; a cationic waxy maize starch cross-linked to a Scott viscosity of 5 gm./60 sec., 100 ml. delivered paste; and a hydroxyethyl white milo starch cross-linked to a Scott viscosity of 4 gm./55 sec., 100 ml. delivered paste. The processing conditions, and cold-water viscosities, are reported in Table IV.

TABLE IV

| Starch | Liquid composition, percent methanol in water | Solids level, percent starch | Processing temp., °F. | Product viscosity, percent concentration of 50-poise paste |
|---|---|---|---|---|
| Native white milo | 55 | 20 | 230 | 6.5 |
| Do | 35 | 20 | 190 | 6.2 |
| Native waxy maize | 55 | 20 | 230 | 6.4 |
| Cross-linked waxy maize starch acetate | 55 | 25 | 260 | 1.8 |
| Cross-linked white milo starch sulfate | 55 | 25 | 240 | 1.6 |
| Cross-linked waxy maize starch sulfate | 55 | 25 | 240 | 2.5 |
| Cross-linked waxy maize starch phosphate | 55 | 25 | 240 | 1.6 |
| Cross-linked cationic waxy maize starch | 55 | 25 | 240 | 1.9 |
| Cross-linked hydroxyethyl white milo starch | 55 | 25 | 240 | 2.5 |

As can be seen from the data in Table IV, the viscosities of pastes prepared from the treated slightly cross-linked waxy starches were exceptionally high; in most cases they were actually higher than pastes prepared from the untreated starches. In the case of the treated native (i.e. non-cross-linked) waxy starches (i.e. the native white milo and waxy maize), the viscosities of the aqueous pastes were only slightly lower than pastes prepared by gelatinizing the untreated starches. A 4% slurry of native waxy maize and a 5.5% slurry of native white milo produced 50-poise pastes upon gelatinization.

EXAMPLE III

This example illustrates the use of organic liquids other than methanol in the process of the invention. The same cross-linked white milo starch phosphate that was used in Example I was employed, and water was again used as the solvent; acetone and ethanol were used as the organic liquids. The processing conditions and viscosities of the reconstituted aqueous pastes are tabulated in Table V.

TABLE V

| Liquid composition | Solids level, percent starch | Processing temp., °F. | Product viscosity, percent concentration of 50-poise paste |
|---|---|---|---|
| 55% acetone, 45% water | 25 | 250 | 1.7 |
| 55% ethanol, 45% water | 25 | 260 | 1.8 |

EXAMPLE IV

This example illustrates the use of the products of the invention in various food preparations. In all cases, the treated starch employed in the formulations was the slightly cross-linked white milo starch phosphate used in Example I, which was treated in accordance with the process set forth in Example I, the exact processing conditions being as follows: The slurry comprised 25% starch, 41% methanol and 34% water; the slurry was treated for about 1.5 minute at a temperature of 260° F.

After the treated starch had been recovered from the slurry, the methanol content was reduced in the following manner. The starch was first washed with additional methanol until the water content was about 4.0%; it was then placed in a fluid bed drier and dried to a water content of about 1.0%. Live steam was then passed through the starch (in the fluid bed drier), while maintaining the starch at a temperature of about 245° F., for about 30 minutes, after which time the methanol content was found to be below 50 p.p.m. An aqueous paste, prepared by mixing the starch with cold (about 25° C.) water in a solids concentration of 2%, had a Brookfield viscosity of 50 poises.

(A) Chocolate drink formulation (AI) Chocolate "milk shake."—21 grams of a commercially available chocolate flavored milk amplifier and 7.5 grams starch were added to one cup of cold milk in a shaker, and the mixture was shaken vigorously for about 1 minute. The drink was in all respects comparable to the "milk shake-type" drinks presently on the market.

(AII) Chocolate drink.—15 grams cocoa and 5.5 grams starch were added to 1 cup of cold milk and the mixture was stirred vigorously with a spoon. The cocoa rapidly dispersed in the milk and remained dispersed therein for a satisfactory period of time.

(B) Instant gravies and sauces (BI) Beef-flavored gravy.—To a dry mixture of 4.2 grams dry beef flavor mixture and 5.5 grams starch 100 grams hot water was added with stirring. The resulting hot, ready to eat gravy was smooth and free from lumps and the texture, consistency and flavor of a natural brown beef gravy.

(BII) Butter sauce.—14.2 grams starch and 1.3 grams salt were mixed into 469.4 grams cold water, after which 13.6 grams melted butter was stirred into the paste. The sauce, which had an excellent flavor and smooth texture, was ready for use.

(C) Instant fruit pie filling

The following ingredients were mixed together:

170 grams sucrose
24 grams starch
160 ml. cherry juice
140 ml. water
292 grams cherries (drained)

The mixture, which required no cooking, was placed into a baked pie crust and the pie was ready for consumption. The mixture was also employed as a filling for a frozen pie with excellent results.

(D) Instant pudding

It is known that an undesirable quality of the "instant puddings" presently on the market is the tendency of the finished puddings to lose water within a relatively short time after preparation. This example illustrates the fact that addition of only 1% (based on the weight of the finished pudding) of a starch of the invention to a commercial pudding formulation greatly improves the water-holding capacity of the pudding.

1.2 gram starch was added to 26.6 grams of a commercial instant pudding formulation, and the pudding was prepared by mixing the dry ingredients with 1 cup of cold milk and allowing the pudding to stand for 5 to 10 minutes. A second pudding was prepared using the commercial formulation without the added starch. The two puddings were identical in flavor, texture, and setting qualities.

Samples of each of the puddings were then placed in 50 ml. graduated centrifuge tubes and centrifuged, in an International Centrifuge, at 2,000 r.p.m. for 30 minutes. There was a decided water separation in the tube containing the commercial pudding (without added starch); no water loss whatsoever occurred in the sample with the added starch.

While the invention has been described in connection with specific embodiments thereof, it will be understood that it is capable of further modification, and this application is intended to cover any variations, uses, or adaptations of the invention following, in general, the principles of the invention and including such departures from the present disclosure as come within known or customary practice in the art to which the invention pertains and as may be applied to the essential features hereinbefore set forth, and as fall within the scope of the invention and the limits of the appended claims.

We claim:
1. A process for preparing a starch product comprising
 (A) placing, in a confined zone, a slurry consisting essentially of
  (1) non-gelatinized waxy starch in an amount not exceeding about 40% by weight based on the weight of said slurry, and
  (2) a liquid portion consisting essentially of
   (a) from about 40% to about 65% by weight based on the weight of said liquid portion, of a solvent for starch, said solvent for starch being a member selected from the group consisting of water, dimethyl sulfoxide, 2-amino ethanol, and N-methyl pyrrolidone, and
   (b) from about 60% to about 35% by weight based on the weight of said liquid portion, of an organic liquid which is not a solvent for starch and which is miscible with the solvent for starch, said organic liquid being a member selected from the group consisting of low molecular weight alcohols and low molecular weight ketones;
 (B) subjecting the slurry to gelatinizing conditions for a time not in excess of about 60 minutes, the conditions of time of treatment, temperature, and relative proportions of the ingredients in said slurry being so selected as to cause from 0% to about 75% of the granules of the waxy starch to become fragmented and the intact granules to be non-birefringent;
 (C) combining with the slurry, after completion of the gelatinizing treatment, an additional quantity of the organic liquid of A2b in any amount by weight at least equal to the weight of the slurry; and
 (D) recovering the processed starch from the liquid portion of the slurry.

2. The process of claim 1 wherein the waxy starch is present in the slurry in an amount of from about 10% to about 40% by weight based on the weight of the slurry.

3. The process of claim 1 wherein the waxy starch is present in the slurry in an amount of from about 10% to about 30% by weight based on the weight of the slurry.

4. The process of claim 1 wherein the organic liquid is methanol.

5. The process of claim 1 wherein the slurry is subjected to gelatinizing conditions for a time not in excess of 15 minutes.

6. The process of claim 1 wherein the waxy starch is a member selected from the group consisting of native white milo starch, native waxy maize starch, slightly cross-linked white milo starch and slightly cross-linked waxy maize starch.

7. The process of claim 1 wherein the waxy starch is a slightly cross-linked white milo starch phosphate.

8. The process of claim 1 including the additional step of reducing the amount of organic liquid retained by the treated waxy starch to less than 300 p.p.m.

9. The process of claim 1 wherein the solvent for starch is water.

10. The process of claim 9 wherein the gelatinizing conditions comprise heating the slurry to a temperature within the range of from about 200° F. to about 300° F.

11. As a composition of matter a cold-water-swelling slightly cross-linked waxy starch, having from about 25% to 100% intact granules, the intact granules of which are substantially non-birefingent, said starch exhibiting the property of rapidly dispersing in cold water to form a smooth paste of higher viscosity than a paste prepared by gelatinizing, in water, a like concentration of the parent, non-gelatinized, slightly cross-linked waxy starch from which said cold-water-swelling slightly cross-linked waxy starch was derived, said starch having been prepared by treating a non-gelatinized slightly cross-linked waxy starch by the process of claim 1.

12. The composition of matter of claim 11 wherein the slightly cross-linked waxy starch is a slightly cross-linked white milo starch phosphate.

13. A process for treating waxy starches in order to impart to the waxy starches the characteristic of rapidly dispersing in cold water to form pastes of exceptionally high viscosity comprising:
 (A) placing in a confined zone a slurry consisting essentially of
  (1) from about 10% to about 40% by weight based on the weight of the slurry, of a non-gelatinized waxy starch, and (2) from about 90% to about 60% by weight based on the weight of the slurry, of a liquid component, said liquid component consisting essentially of a mixture of
- (a) from about 40% to about 65% by weight based on the weight of said liquid component, of water, and
- (b) from about 60% to about 35% by weight based on the weight of said liquid component, of an organic liquid selected from the group consisting of low molecular weight alcohols and low molecular weight ketones;

(B) heating said slurry to a temperature within the range of from about 200° F. to about 300° F. for a period of time not in excess of about 60 minutes; the conditions of time of treatment, temperature, and relative proportions of ingredients in the slurry being so selected as to cause the starch granules to become completely non-birefringent, to cause from 0% to about 75% of the granules to become fragmented, and to result in the starch attaining exceptionally high viscosity when dispersed in cold water to form a paste;

(C) combining with the slurry an additional quantity of the organic liquid of A2b in an amount by weight at least equal to the weight of the slurry; and (D) recovering the processed starch from the slurry.

14. The process of claim 13 wherein the starch is present in the slurry in an amount of from about 10% to about 30% by weight based on the weight of the slurry.

15. The process of claim 13 wherein the organic liquid is methanol.

16. The process of claim 13 wherein the slurry is heated for a period of time of less than about 15 minutes.

17. The process of claim 13 wherein the additional quantity of organic liquid is added to the slurry with agitation.

18. The process of claim 13 wherein the waxy starch is a member selected from the group consisting of native white milo starch, native waxy maize starch, slightly cross-linked white milo starch and slightly cross-linked waxy maize starch.

19. The process of claim 13 wherein the waxy starch is a slightly cross-linked white milo starch phosphate.

20. The process of claim 13 including the additional step of reducing the amount of organic liquid retained by the treated starch to less than about 300 p.pm.

21. The process of claim 20 wherein the organic liquid retained by the starch is reduced by:

(A) first reducing the water content of the starch to not more than about 1.5%, and (B) contacting the starch with live steam, while maintaining the starch at a temperature above that at which the steam will condense, for a time sufficient to reduce the content of organic liquid to less than 300 p.p.m.

22. A process for treating a non-gelatinized waxy starch to render it capable of rapidly hydrating in cold water to form a paste of exceptionally high viscosity comprising:

(A) placing in a confined zone a slurry consisting essentially of:
  about 25% by weight, of a waxy starch, about 41%, by weight, of methanol, and about 34%, by weight, of water (B) subjecting the slurry to a temperature of about 260° F. for a time not in excess of about 5 minutes, (C) combining said slurry, with agitation, with additional methanol in an amount by weight at least equal to the weight of the slurry, and (D) recovering the treated starch from the slurry.

23. The process of claim 22 wherein the waxy starch is a slightly cross-linked white milo starch phosphate.

24. The process of claim 23 wherein the slurry is subjected to the temperature of 260° F. for about 1.5 minute.

25. The process of claim 24 including the additional step of reducing the amount of methanol retained by the treated starch to less than about 300 p.p.m.

26. The process of claim 25 wherein the methanol retained by the starch is reduced by:

(A) first reducing the water content of the starch to not more than about 1.5%, and (B) contacting the starch with live steam, while maintaining the starch at a temperature above that at which the steam will condense, for a time sufficient to reduce the content of methanol to less than 300 p.p.m.

References Cited

UNITED STATES PATENTS

| | | | |
|---|---|---|---|
| 2,280,723 | 4/1942 | Schoch | 127—71 |
| 2,587,650 | 3/1952 | Rist | 127—71 |
| 3,399,081 | 8/1968 | Bernetti | 127—71 |

MORRIS O. WOLK, Primary Examiner

S. MARANTZ, Assistant Examiner

U.S. Cl. X.R.

99—139, 144; 127—70, 71